(12) United States Patent
Dedmon

(10) Patent No.: US 9,788,484 B2
(45) Date of Patent: Oct. 17, 2017

(54) STRING TRIMMER SUPPORT ATTACHMENT

(71) Applicant: Mark L. Dedmon, Cherryville, NC (US)

(72) Inventor: Mark L. Dedmon, Cherryville, NC (US)

( * ) Notice: Subject to any disclaimer, the term of this patent is extended or adjusted under 35 U.S.C. 154(b) by 0 days.

(21) Appl. No.: 14/223,783

(22) Filed: Mar. 24, 2014

(65) Prior Publication Data

US 2014/0283388 A1   Sep. 25, 2014

Related U.S. Application Data

(60) Provisional application No. 61/804,417, filed on Mar. 22, 2013.

(51) Int. Cl.
*A01D 34/90*   (2006.01)
*A01D 34/416*   (2006.01)

(52) U.S. Cl.
CPC ....... *A01D 34/902* (2013.01); *A01D 34/4166* (2013.01)

(58) Field of Classification Search
CPC .... A01D 34/00; A01D 34/001; A01D 34/412; A01D 34/416; A01D 34/4167; A01D 34/4165; A01D 34/84; A01D 34/90; A01D 34/902; A01G 3/06; F41A 23/08; F41A 23/10
See application file for complete search history.

(56) References Cited

U.S. PATENT DOCUMENTS

| 4,224,784 | A | * | 9/1980 | Hansen | A01G 3/062 56/12.7 |
|---|---|---|---|---|---|
| 4,704,849 | A | | 11/1987 | Gilbert et al. | |
| 4,922,694 | A | * | 5/1990 | Emoto | A01D 34/001 172/17 |
| 5,092,112 | A | * | 3/1992 | Buckendorf, Jr. | A01D 34/4167 56/12.7 |
| 5,095,687 | A | * | 3/1992 | Andrew | A01D 34/416 172/17 |
| 5,317,807 | A | * | 6/1994 | Pulley | A01D 34/001 30/275.4 |
| 5,450,715 | A | * | 9/1995 | Murray | A01D 34/001 56/12.7 |
| 5,459,985 | A | * | 10/1995 | Gedert | A01D 34/001 30/296.1 |

(Continued)

*Primary Examiner* — Alicia Torres
*Assistant Examiner* — Adam Behrens
(74) *Attorney, Agent, or Firm* — Global Intellectual Property Agency, LLC; Jordan Sworen

(57) ABSTRACT

A string trimmer support attachment. The device includes a base on which the shaft of a string trimmer can be secured. The present invention further includes a pair of legs that are pivotally attached to the base. The legs can be folded so as to be aligned against the string trimmer shaft when not in use. Alternatively, the legs can be folded outward so that the legs are roughly perpendicular to the string trimmer shaft in order to support the head of a string trimmer in an upright and angled orientation that is convenient for changing the trimmer line. Further, in the unfolded configuration the legs are disposed at an angle relative to one another to provide a stable support for the string trimmer, wherein the string trimmer proximal end acts as a third portion of a tripod when the legs are deployed.

8 Claims, 9 Drawing Sheets

(56) References Cited

U.S. PATENT DOCUMENTS

| | | | | |
|---|---|---|---|---|
| 5,467,584 A * | 11/1995 | Boyles | ............... | A01D 34/001 56/12.7 |
| 5,477,665 A * | 12/1995 | Stout | ................... | A01D 34/001 56/16.7 |
| 5,970,692 A * | 10/1999 | Foster | ................. | A01D 34/001 56/12.1 |
| 5,970,694 A * | 10/1999 | Knox, Jr. | ............ | A01D 34/001 172/17 |
| 6,745,549 B1 * | 6/2004 | Taylor | .................. | A01D 34/001 56/12.7 |
| 7,032,494 B2 * | 4/2006 | Wygant | ................. | F41A 23/08 248/171 |
| 7,036,297 B2 * | 5/2006 | Popp | .................... | A01D 34/001 56/12.7 |
| 9,131,639 B1 * | 9/2015 | Groves | ............... | A01D 34/416 |
| 2004/0221560 A1 * | 11/2004 | Dunda | .................. | A01D 34/90 56/12.7 |
| 2005/0098328 A1 * | 5/2005 | Popp | .................... | A01D 34/001 172/17 |
| 2008/0202088 A1 * | 8/2008 | Angelle | ............... | A01D 34/82 56/12.7 |
| 2009/0025352 A1 * | 1/2009 | Angelle | ............... | A01D 34/001 56/16.7 |
| 2009/0090011 A1 * | 4/2009 | Gosschalk | ............ | A01D 34/84 30/296.1 |
| 2010/0186240 A1 * | 7/2010 | Waugh | .................. | A01D 34/90 30/286 |
| 2014/0013542 A1 * | 1/2014 | Wang | .................. | A01D 34/824 16/429 |

* cited by examiner

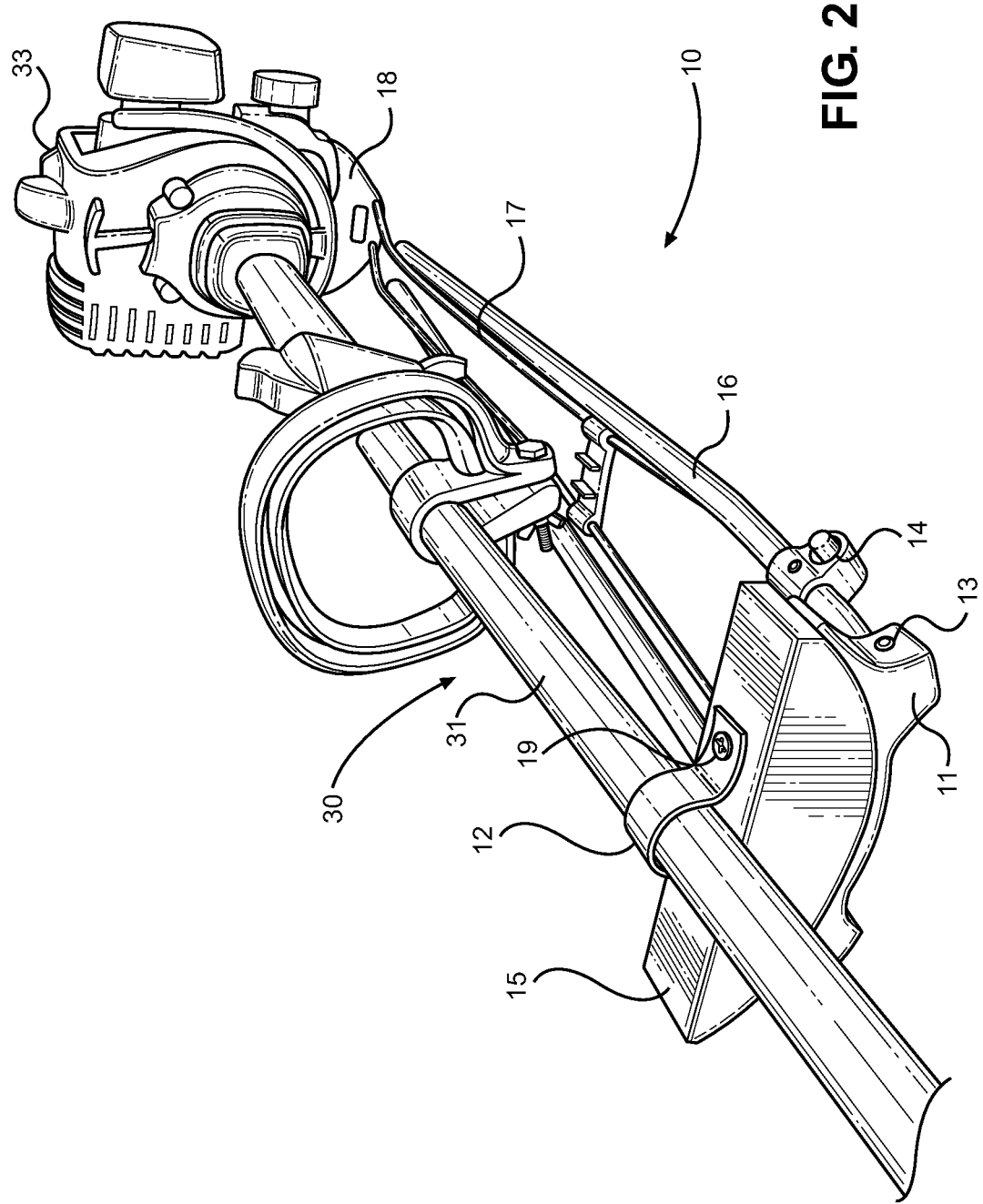

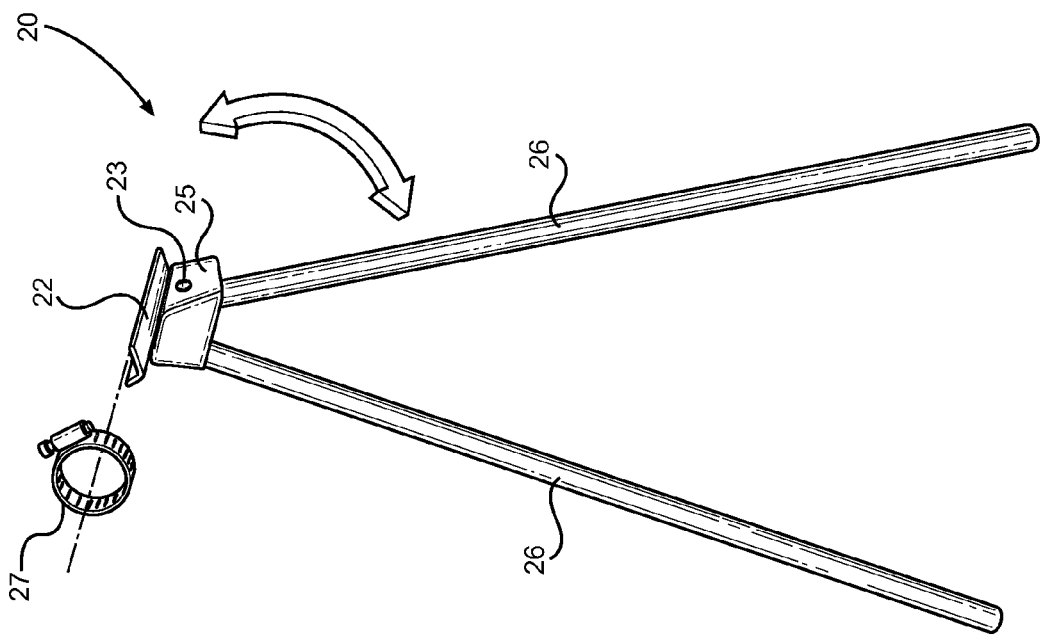
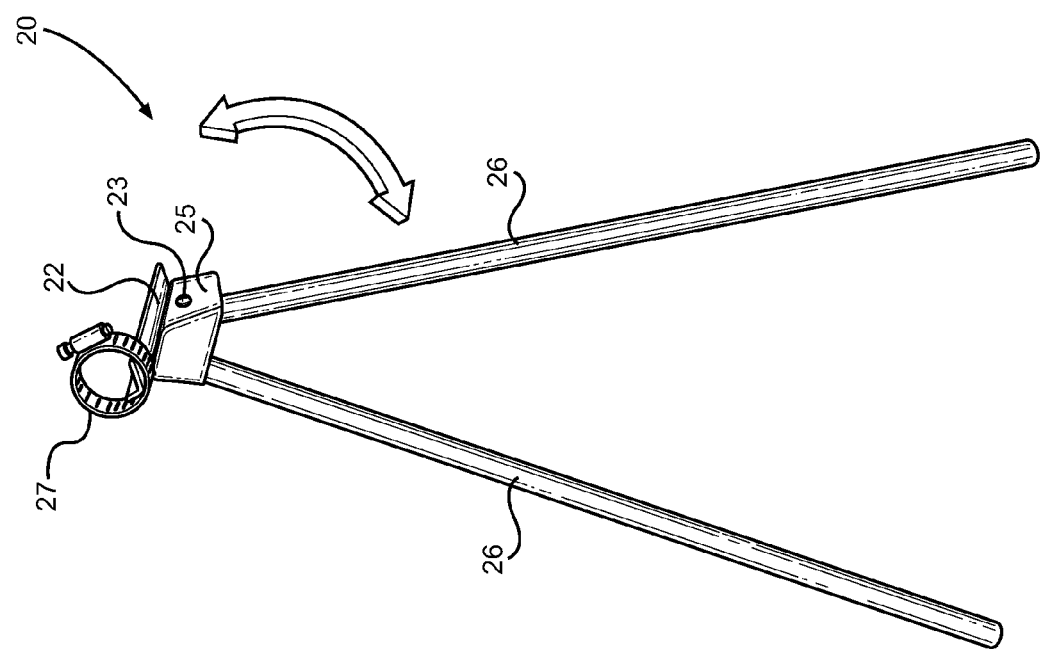

STRING TRIMMER SUPPORT ATTACHMENT

CROSS REFERENCE TO RELATED APPLICATION

This application claims the benefit of U.S. Provisional Application No. 61/804,417 filed on Mar. 22, 2013, entitled "Trimmer Legs." The above identified patent application is herein incorporated by reference in its entirety to provide continuity of disclosure.

BACKGROUND OF THE INVENTION

Field of the Invention

The present invention relates to a string trimmer support attachment. More specifically, the present invention describes a support attachment comprising a base that is secured to the shaft of a string trimmer. A pair of legs are pivotally secured to the base and can be arranged in an unfolded configuration for supporting a string trimmer in an upright orientation for changing the trimmer line. Alternatively, the legs can be pivoted towards the trimmer shaft such that the string trimmer can be used in the ordinary manner while the present invention is secured thereon.

A string trimmer, also commonly referred to as a weed wacker or a weed trimmer, is a powered, handheld device comprising a thin line rather than a blade for cutting grass and other vegetation located near objects that are not easily accessed by lawn mowers, such as areas adjacent to fences, trees, or the sides of buildings. String trimmers include a power source or a plug that attaches to the source at one end, a long shaft extending therefrom, and a rotatable head comprising a thin line on the opposing end. The thin line, which is traditionally a monofilament plastic, is hand-wound around the head and secured thereon.

In use, the power source actuates the high speed rotation of the head and of the thin line. A user brings the rotating thin line into contact with unwanted vegetation and as the line rotates, the line cuts through the vegetation. The string trimmer is lightweight which allows the user to control the height and positioning of the trimmer head while cutting vegetation. As the line cuts through the plant-life, the line becomes worn and broken away from the existing line, thus requiring that the user either replace or unwind a length of line that remains within the trimmer head.

Newer models comprise internal mechanisms that enable the automatic extension of the line, whereas older models must be turned off in order for the line to be extended manually, however both newer and older models require empty trimmer lines to be changed manually. Manually changing the trimmer line can be a difficult process because the string trimmer is difficult to hold in a configuration that provides the user with access to the head of the string trimmer, and the trimmer line therein.

To remove the trimmer head to change the trimmer line, a user must first remove the cap above the spool by pressing in pins or unscrewing or removing bolts that secure the cap. Next, the empty spool is removed and a new length of trimmer line is manually wound around the spool and threaded through the cap, which is then placed onto the trimmer head. Performing these steps is a difficult task when the string trimmer is unsupported because of the string trimmer's uneven weight distribution. Solutions to supporting the trimmer include sitting on a bench to replace the line while holding the trimmer between the user's legs, or by resting the trimmer on the ground and sitting on the ground near the string trimmer in order to change or lengthen the trimmer line. These solutions are not ergonomically advantageous as these methods of changing the wire involve unusual sitting positions. Thus, a support device that holds a string trimmer in an upright position to facilitate changing of the string trimmer line is desired.

The present invention provides a string trimmer support attachment for an existing string trimmer. The attachment comprises a base having a pair of legs pivotally secured thereto, and wherein the base is adapted to secure the shaft of a string trimmer. The legs are able to be folded along a shaft of a string trimmer disposed within the base, or the legs can be unfolded so as to support the string trimmer in an upright position. In the unfolded configuration, the pair of legs and the string trimmer resemble a tripod-like formation, which provides stability to the string trimmer while the user is changing the trimmer line. Further, this formation supports the string trimmer in an inverted position, placing the trimmer head in an upright position. This enables a user to change the trimmer line without requiring that the user to sit down or bend over in an uncomfortable manner. The present invention holds the trimmer head in a convenient, easily-accessible position that is more comfortable for the user and reduces the overall changing time of the trimmer line. When not in use, the legs of the string trimmer attachment can be folded along the shaft of the string trimmer, while still permitting the string trimmer to be used in the usual manner.

Description of the Prior Art

Devices have been disclosed in the prior art that relate to string trimmer support devices and string trimmer attachments. These include devices that have been patented and published in patent application publications. These devices generally relate to attachments that increase the mobility of the string trimmer. The following is a list of devices deemed most relevant to the present disclosure, which are herein described for the purposes of highlighting and differentiating the unique aspects of the present invention, and further highlighting the drawbacks existing in the prior art.

One such prior art device is U.S. Pat. No. 4,922,694 to Emoto, which discloses a wheeled support for line trimmers. The support includes an A-shaped frame and two wheels attached thereto. The support is attached to the shaft of the string trimmer and enables the trimmer to be used as a wheeled lawnmower. Thus, Emoto fails to provide a device that can be configured to support a string trimmer head in an upright position to allow convenient access to the trimmer head for the purpose of changing the trimmer line.

U.S. Pat. No. 5,467,584 to Boyles discloses a line trimmer stabilizer, which includes a shaft and a housing with a cylindrical bore for receiving and mating with a ball roller. The shaft of the device extends from the trimmer shaft, and comprises the housing and ball at the end thereof. The ball is configured to rotate within the housing and serves as a support member upon which the trimmer is transported. While Boyles discloses a support member for a string trimmer, the present invention differs from the prior art in that it supports the trimmer in an upright position for the purpose of changing or extending the trimmer line.

U.S. Pat. No. 4,704,849 to Gilbert discloses a wheel-mounted trimmer, which includes a carrier having a frame member connected to a yoke that is capable of pivoting to allow for the insertion or removal of the handle of the trimmer. Moreover, the ends of the frame comprise wheels that facilitate the transportation of the trimmer throughout the lawn. Thus, Gilbert fails to disclose a device that supports the trimmer head in a position that enables a person to change the trimmer line or string.

Yet another device, U.S. Pat. No. 4,224,784 to Hansen discloses an attachment for a string trimmer, which converts the trimmer into an edge trimmer. The attachment includes a collar with support legs attached thereto, and a pair of wheels attached to the support legs. The trimmer is then inverted in order to make the face of the trimmer lie perpendicularly to the ground, whereby the trimmer is capable of cutting in a vertical manner instead of the traditional horizontal cutting orientation. Thus, the device of Hansen fails to support a string trimmer head in an upright position, which enables efficient access of the trimmer head by a user.

Finally, U.S. Pat. No. 5,450,715 to Murray discloses a wheel assembly for string trimmers. The assembly includes an A-shaped frame having a pair of leg members that extend from the shaft of the trimmer. The frame further includes wheels that are positioned at the end of the legs, which enables the device to be transported across a lawn. The device of Murray, however, fails to provide a support adapted to maintain the trimmer head in an upward position in order to enable easy changing of trimmer line.

In light of the devices disclosed in the prior art, it is submitted that the present invention is substantially divergent in design elements from the prior art and consequently it is clear that there is a need in the art for an improvement to existing string trimmer support attachment devices. In this regard the instant invention substantially fulfills these needs.

SUMMARY OF THE INVENTION

In view of the foregoing disadvantages inherent in the known types of string trimmer support devices now present in the prior art, the present invention provides a new string trimmer support device wherein the same can be utilized for providing convenience for the user when changing the trimmer line of a string trimmer.

It is therefore an object of the present invention to provide a new and improved string trimmer attachment device that has all of the advantages of the prior art and none of the disadvantages.

It is another object of the present invention to provide a string trimmer attachment that is configured to support the trimmer head in an upright position, which enables a user to easily access the trimmer head in order to change the trimmer line.

Another object of the present invention is to provide a string trimmer attachment, which includes a pair of legs that can pivot between a folded configuration that allows the string trimmer to be used in the traditional manner, and an unfolded configuration that facilitates changing of the trimmer line.

Yet another object of the present invention is to provide a string trimmer attachment, which is attachable onto various types of string trimmers including electric or gas powered trimmers.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 2 shows a perspective view of an embodiment of the present invention as secured to a string trimmer and wherein the legs are in a folded configuration.

FIGS. 4A and 4B show an additional embodiment of the string trimmer attachment of the present invention.

DETAILED DESCRIPTION OF THE INVENTION

Figure 1A:
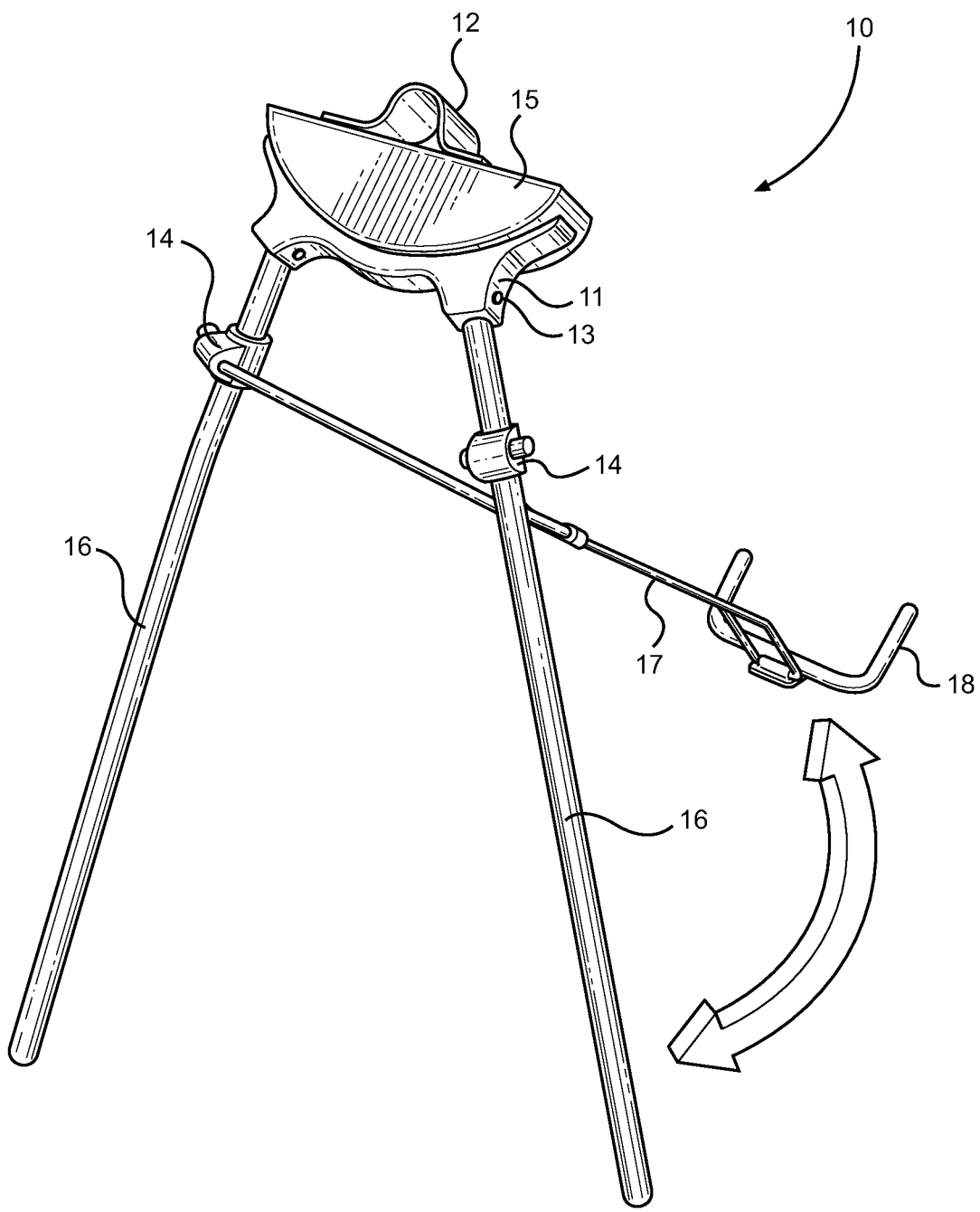
FIG. 1A shows a perspective view of an embodiment of the present invention wherein the base has a semi-circular shape.

Reference is made herein to the attached drawings. Like reference numerals are used throughout the drawings to depict like or similar elements of the string trimmer attachment. For the purposes of presenting a brief and clear description of the present invention, the preferred embodiment will be discussed as used for supporting a string trimmer in an upright position to facilitate changing of the trimmer line. The figures are intended for representative purposes only and should not be considered to be limiting in any respect.

Referring now to FIG. 1A, there is shown a perspective view of an embodiment of the present invention wherein the base has a semi-circular shape. The string trimmer attachment 10 comprises a base 15, which is adapted to secure the shaft of a string trimmer thereon. The base 15 further comprises a securement means, such as a U-clamp 12, that is adapted to be positioned over the shaft of a string trimmer and secured to a top portion of the base 15. The base 15 further comprises a leg receiving section 11 corresponding to the curved portion of the base 15. The leg receiving section 11 may be integrally constructed as part of the base 15, so that the leg receiving section 11 is of unitary construction with the base 15. Alternatively, the leg receiving section 11 of the base 15 may be a separate component that is permanently attached to the base 15 by welding, adhesives, or other securing methods.

A pair of legs 16 are pivotally secured to the leg receiving section 11 of the base 15. Each leg 16 is pivotally secured to the leg receiving section 11 by means of a pin 13 disposed through said leg receiving section 11, through said leg 13, and secured to an opposing portion of said leg receiving section 11. In this way, the legs 13 are able to rotate between a folded configuration in which the legs are arranged adjacent to the shaft of a string trimmer for when the string trimmer support device is not in use, or an unfolded configuration such that a string trimmer disposed on the base 15 is supported in an upright position to facilitate changing of the trimmer line. When the legs 16 are in the unfolded configuration, the legs extend outward from the base 15 at an angle relative to one another. In this way, the legs are positioned similarly to the legs of a tripod, such that the legs have an upside-down V-type shape. Thus, the legs 16 are closer together at the end of the legs pivotally attached to the base, and the legs are farther apart at the opposing end of the legs.

Each leg 16 comprises an attachment tube 14 thereon. An aperture extends through each attachment tube 14, and the apertures are adapted to receive a support arm 17 therein. A pair of support arms 17 are provided and each support arm 17 has a first end that is insertable into an attachment tube 14. The second ends of the support arms 17 converge together and are attached to a U-shaped holding structure 18. The U-shaped holding structure 18 extends from, and is substantially perpendicular to the support arms 17. The support arms 17 are rotatable within the apertures of the attachment tubes 14 and are independently movable in relation to the rotational position of the legs 16. The U-shaped holding structure 18 is used to support the bulky portion of a string trimmer while the head of the string trimmer is arranged in an upright position for changing of the trimmer line.

Figure 1B:
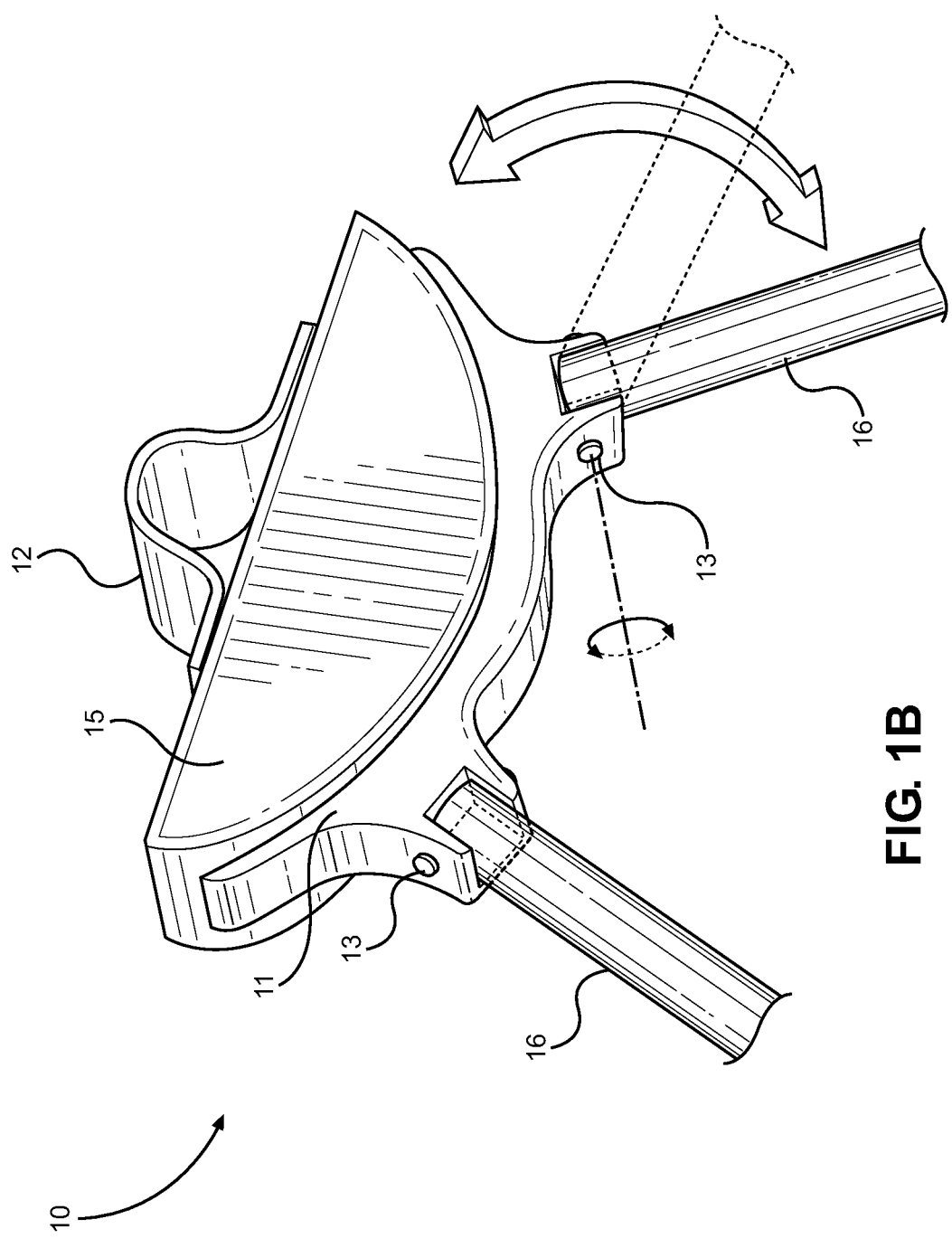
FIG. 1B shows a perspective view of the back portion of an embodiment of the string trimmer attachment wherein the base has a semi-circular shape.

Referring now to FIG. 1B, there is shown a perspective view of the back portion of an embodiment of the string trimmer attachment wherein the base has a semi-circular shape. The leg receiving section 11 of the base 15 is configured to secure a pair of elongated legs 16 therein. The leg receiving section 11 includes grooves that have apertures through which a pin 13 can extend. The pins 13 are inserted through the apertures of the leg receiving section 11, and into a leg 16, where they are sealed at the opposing end. The legs 16 are configured to fit within the leg receiving section 11 such that the legs 16 are rotatable therein. The legs 16 can be rotated into a folded configuration about the pins 13 until the legs 16 are positioned adjacent to the string trimmer shaft, whereby their rotation is restricted by the shape of the leg receiving section 11. Furthermore, the leg receiving section 11 is shaped such that the legs 16 are prevented from further rotation once extended into the unfolded configuration as shown in FIG. 1A. In the unfolded configuration, a portion of the leg receiving section 11 blocks the path of rotation of the legs 16 such that the legs cannot further rotate. In this way, the shape of the leg receiving section 11 helps to maintain the legs 16 in an unfolded configuration and prevent the device from collapsing due to over-rotation of the legs 16.

Referring now to FIG. 2, there is shown a perspective view of an embodiment of the present invention as secured to a string trimmer and wherein the legs are in a folded configuration. To install the embodiment of the string trimmer attachment 10 having a semi-circular base, the U-clamp 12 is placed over the shaft 31 of the string trimmer 30 and is secured to the base 15 by one or more fasteners 19, such as screws. Once installed, the legs 16 can be positioned in a folded configuration in which the legs 16 are adjacent to, and alongside of, the trimmer shaft 31. The folded configuration is compact such that it is convenient for the storage of the string trimmer 30. Furthermore, the folded configuration allows a user to use the string trimmer 30 in the ordinary manner while the string trimmer attachment 10 of the present invention is attached to the string trimmer 30. The string trimmer attachment 10 is sufficiently lightweight such that attachment of the device to a string trimmer 30 does not render use of the string trimmer to be cumbersome.

Figure 3:
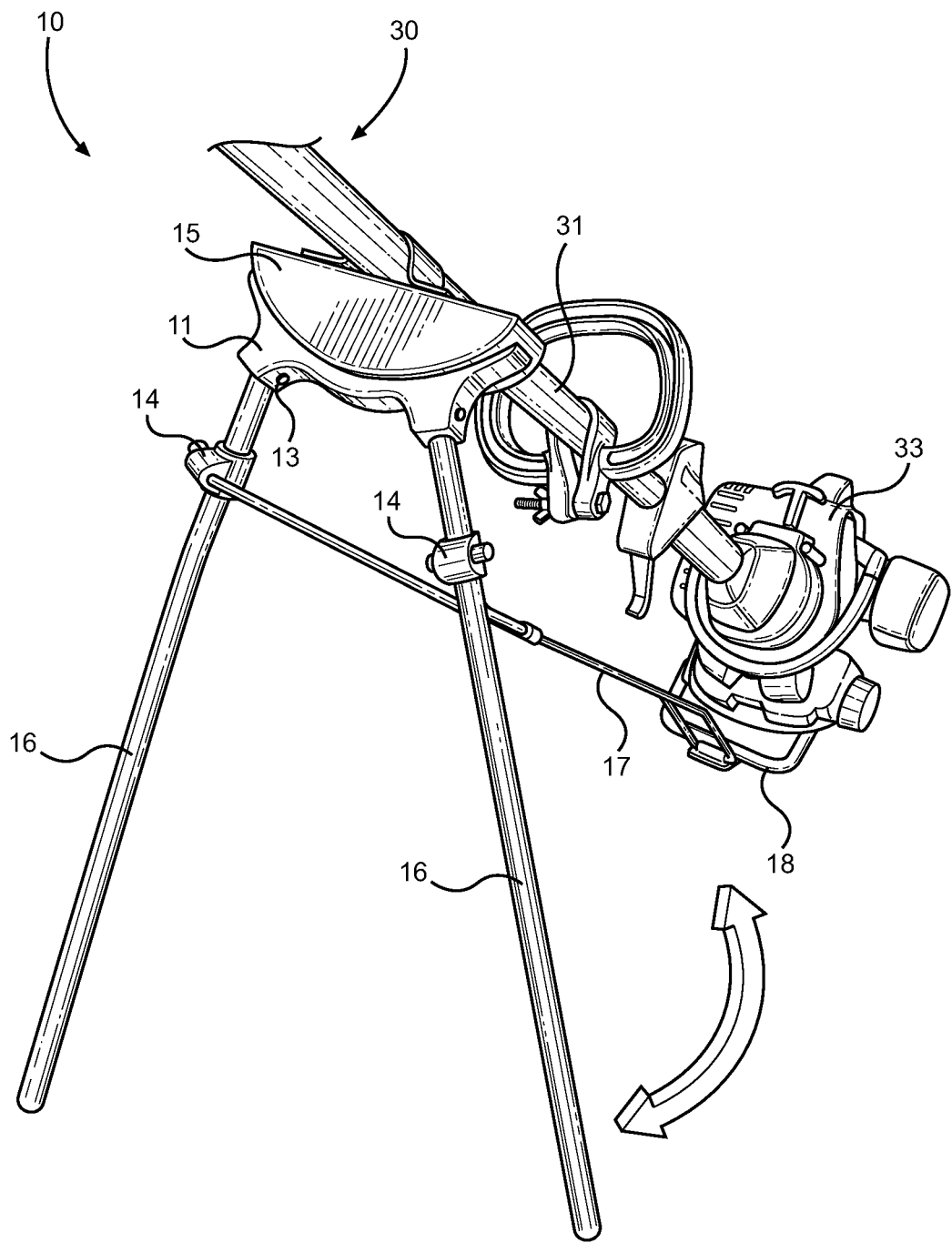
FIG. 3 shows a perspective view of an embodiment of the present invention as secured to a string trimmer and wherein the legs are in an unfolded configuration.

Referring now to FIG. 3, there is shown a perspective view of an embodiment of the present invention as secured to a string trimmer and wherein the legs are in an unfolded configuration. The present invention is configured for supporting a string trimmer in an upright and angled position, which enables a user to easily change or adjust the length of the trimmer line. The pair of legs 16 functions as two legs of a tripod, and the string trimmer 30 serves as the third leg. If the unfolded configuration does not provide sufficient support for the string trimmer 30, the support arms 17 can be used to provide additional support. The U-shaped holding structure 18 is configured to provide support for the bulky battery pack or gas tank 33 depending upon the style of string trimmer used.

In FIGS. 4A and 4B, there are shown views of an additional embodiment of the string trimmer attachment of the present invention. While the present invention is designed for attachment to battery, electric, and gas powered string trimmers, the second embodiment is configured for use with less bulky trimmers such as electric or battery powered trimmers. In contrast to the embodiment of the present invention shown in FIGS. 1 and 2, the embodiment shown in FIGS. 4A and 4B does not include attachment tubes, support arms, or a U-shaped holding structure.

The string trimmer attachment 20 comprises a base 25, which includes a channel 22 thereon. The channel 22 is permanently affixed to the upper surface of the base 25 by welding or other suitable methods of fastening. The channel 22 extends past the length of the base 25 and is adapted to support a string trimmer shaft thereon. The channel 22 has a concave surface so as to be shaped similarly to the curvature of a string trimmer shaft. A string trimmer shaft can be secured on the channel 22 by fastening the trimmer shaft to the channel 22 with a ring-shaped hose clamp 27. The hose clamp 27 wraps around the bottom side of the channel 22 and encircles the trimmer shaft, thereby securing the trimmer shaft to the channel.

Similar to the embodiment of the present invention shown in FIGS. 1 and 2, the base 25 of the embodiment shown in FIGS. 4A and 4B is adapted to receive a pair of legs 26 therein. The legs 26 are insertable into the base 25 and are pivotally secured therein by a pin 23. The pin 23 is inserted into an aperture within the base 25, extends through the leg 26, and is secured to an opposite side of the base. The legs 26 are rotatable such that the legs are capable of having a folded or unfolded configuration. In the unfolded configuration, the legs extend outward from the base 25 and support the string trimmer in an upright, angled orientation convenient for changing the trimmer line of a string trimmer. The legs 26 extend from the base 25 at an angle relative to one another. In this way, the legs 26 provide stability to the base and string trimmer disposed thereon. In the folded configuration, the legs 26 are pivoted such that they are adjacent to, and alongside of, the string trimmer shaft.

Figure 5A:
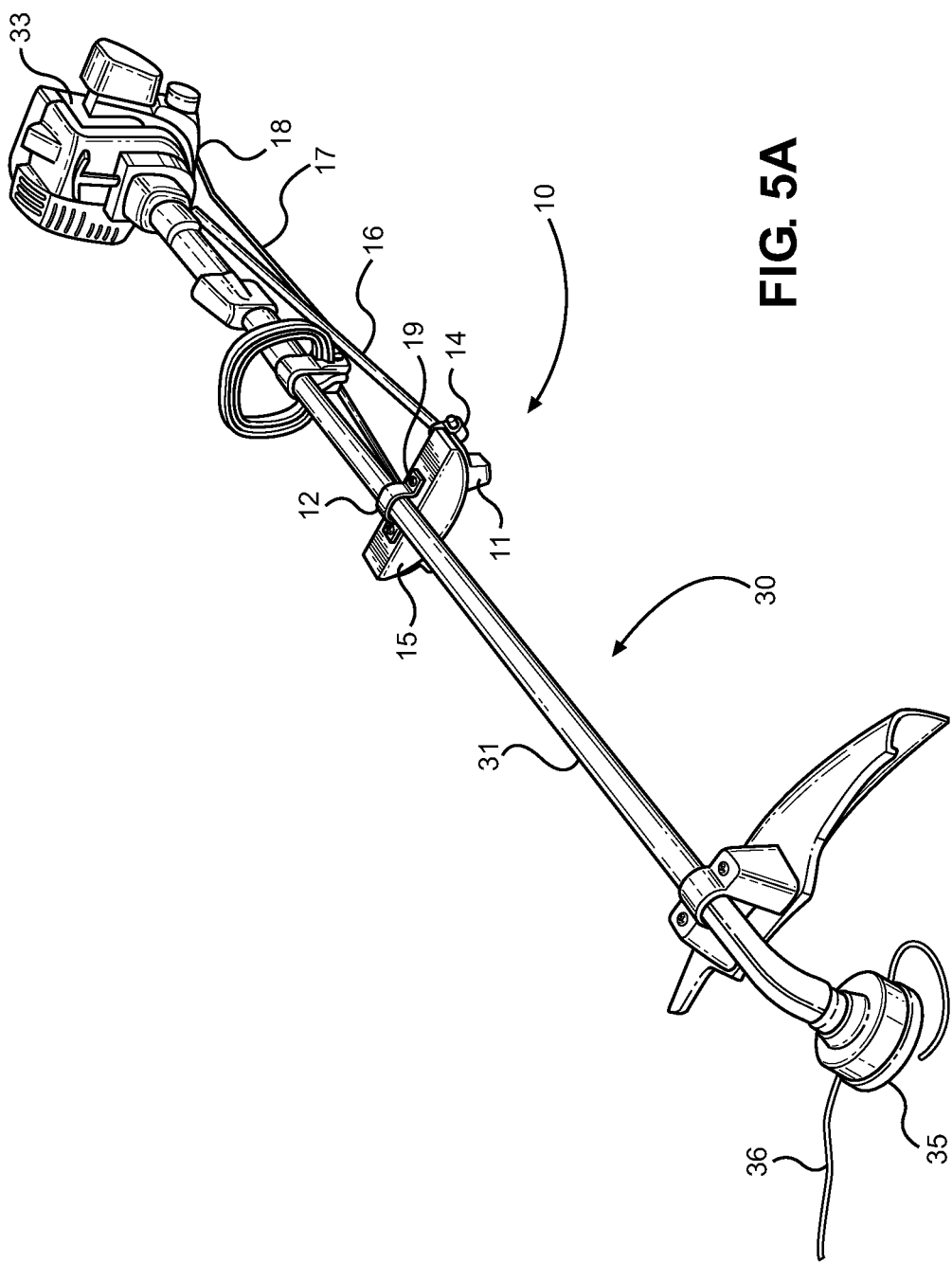
FIGS. 5A and 5B show perspective views of different embodiments of the string trimmer attachment secured to string trimmers.
Figure 5B:
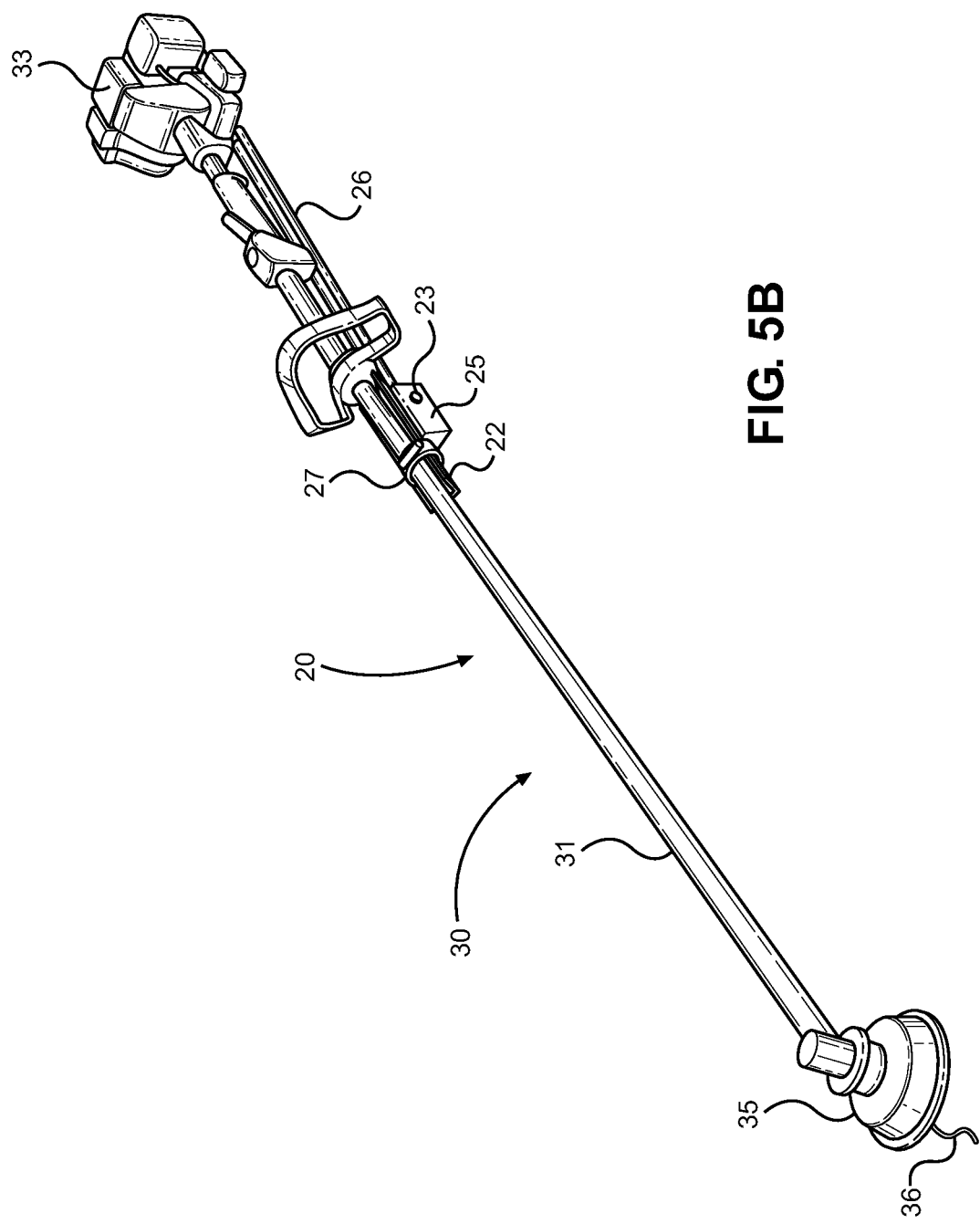

Referring now to FIGS. 5A and 5B there are shown perspective views of different embodiments of the string trimmer attachment secured to string trimmers. In either embodiment, the base 15, 25 is secured to the shaft of a string trimmer 31. In the first embodiment, the base 15 is secured to the shaft 31 of a string trimmer 30 by positioning a U-clamp 12 over the shaft 31 and securing the U-clamp 12 to the base 15 by means of one or more fasteners 19. In a folded configuration, the legs 16 of the string trimmer attachment 10 are folded against the shaft 31 of the string trimmer 30 so as to allow a user to use the string trimmer 30 in the ordinary manner. Further, the support arms 17 are also folded so as to be positioned adjacent to the shaft of the string trimmer. In the folded configuration, the U-shaped holding structure 18 can be secured to the bulky portion 33 of the string trimmer. In the embodiment shown in FIG. 5B, a shaft 31 of a string trimmer 30 is secured to the base 25 by positioning the shaft 31 on the channel 22 and fastening the shaft 31 on the channel 22 using a hose clamp 27 that wraps around both the channel 22 and the trimmer shaft 31. Similar to the embodiment of FIG. 5A, the embodiment of FIG. 5B comprises a pair of legs 26 pivotally attached to the base 25 by means of pins 23, whereby the legs 26 are rotatable within the base 25, enabling the device to assume a tripod-like formation for the changing of trimmer line 36.

Figure 6:
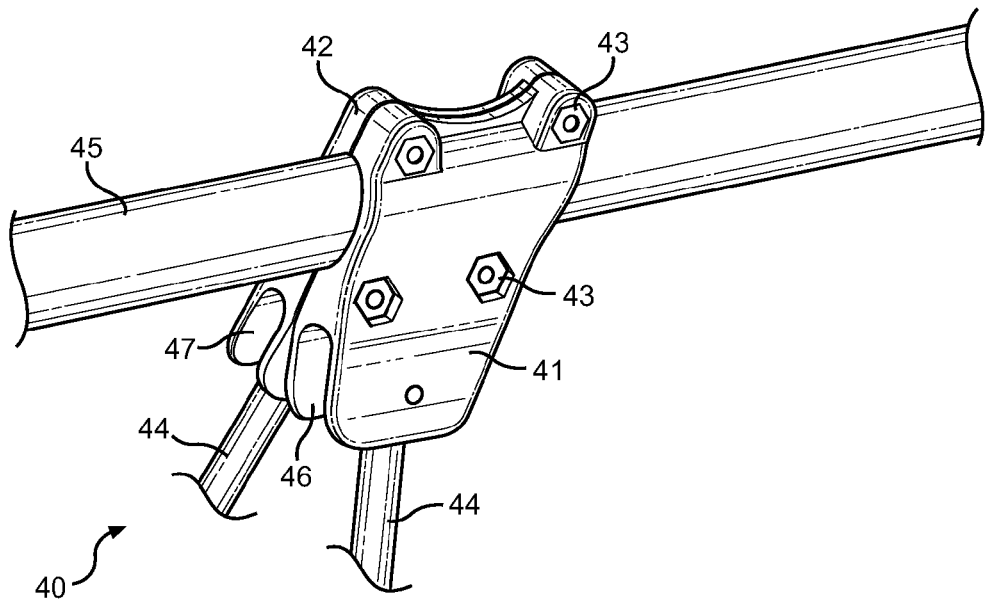
FIG. 6 shows a perspective view of an embodiment of the string trimmer attachment wherein the base has two halves.

Referring now to FIG. 6, there is shown a perspective view of an embodiment of the string trimmer attachment wherein the base comprises a first base half 41 and a second base half 42. Each base half 41,42 has a semi-circular groove therein such that when the first and second base halves 41,42 are placed adjacent to one another, the semi-circular grooves align and form an opening with a circular-cross section through which the shaft 45 of a string trimmer can be inserted. Each base half 41, 42 further includes a plurality of apertures 43 such that when the base halves 41, 42 are placed together around a trimmer shaft 45, the apertures 43 on each base half align, allowing a fastener, such as a screw, to be placed through the aligned apertures 43 to secure the two base halves 41, 42 together around a string trimmer shaft. Preferably, the apertures are arranged on the base halves such that fasteners are disposed through the aligned apertures in areas above and below the channel through which the shaft of a string trimmer is positioned. This arrangement helps to ensure that the shaft is held securely within the base of the present invention.

Figure 7:
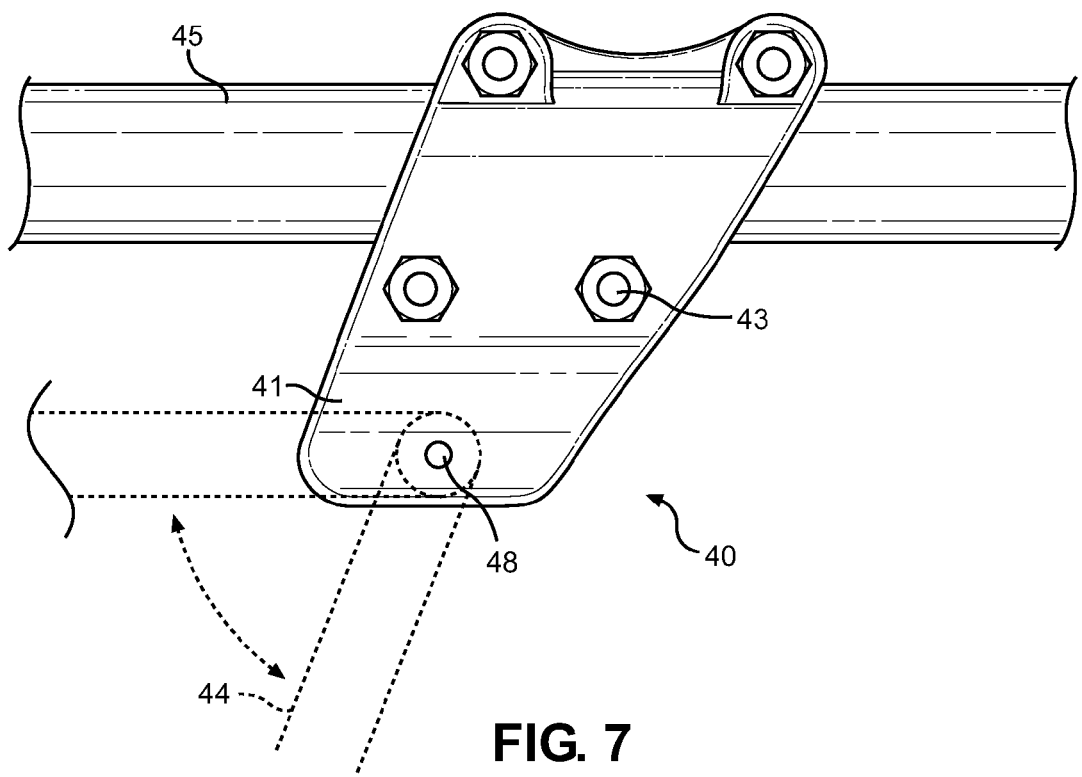
FIG. 7 shows a side view of an embodiment of the string trimmer attachment wherein the base has two halves.

Referring now to FIG. 7, there is shown a side view of an embodiment of the string trimmer attachment wherein the base has two halves. Each base half comprises a channel 46, 47 extending therethrough, and each channel is adapted to receive a leg 44 therein. The legs 44 are pivotally secured within the channels 46,47 by means of a pin 48 that extends through a base half 41,42, through a leg 44, and is secured to an opposing portion of the same base half 41,42. The channels 46, 47 allow the legs 44 to rotate in a similar fashion as in the other embodiments of the present invention. In a folded configuration, the legs are arranged alongside of the shaft of the string trimmer so as to allow the string trimmer to be used in the ordinary fashion. Alternatively, the legs can be unfolded such that they are disposed at an angle relative to the trimmer shaft in order to support the string trimmer head in an upright, angled position convenient for changing the trimmer line. For example, in the unfolded configuration the legs may be substantially perpendicular to the trimmer shaft.

Figure 8:
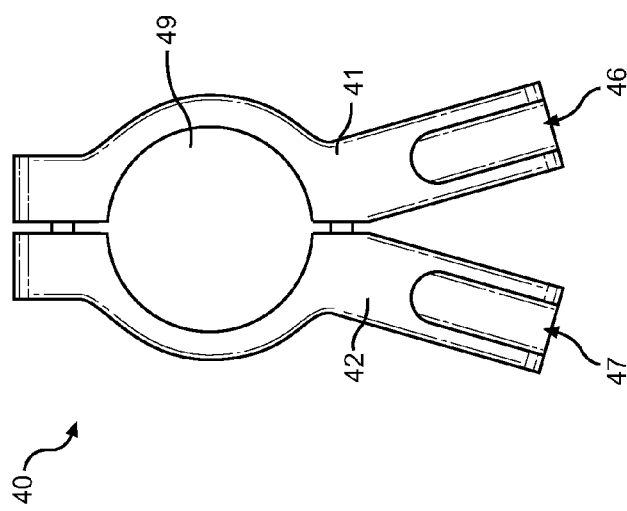
FIG. 8 shows a cross-sectional view of an embodiment of the string trimmer attachment wherein the base has two halves.

Referring now to FIG. 8, there is shown a cross-sectional view of an embodiment of the string trimmer attachment wherein the base has two halves. The first base half 41 comprises a semi-circular groove thereon that aligns with a semi-circular groove on the second base half 42. When the pair of base halves 41, 42 is aligned, the grooves form a circular opening 49 through which a shaft of a trimmer can be positioned. The lower portions of each base half 41, 42 comprise a channel 46, 47 extending therethrough. Further, the lower portions of each base half extend apart from one another such that the lower ends are disposed at an angle relative to one another. In this way, the legs positioned within each channel 46, 47 extend apart from one another so that the legs have a tri-pod like formation, similar to the other embodiments of the present invention.

Figure 9:
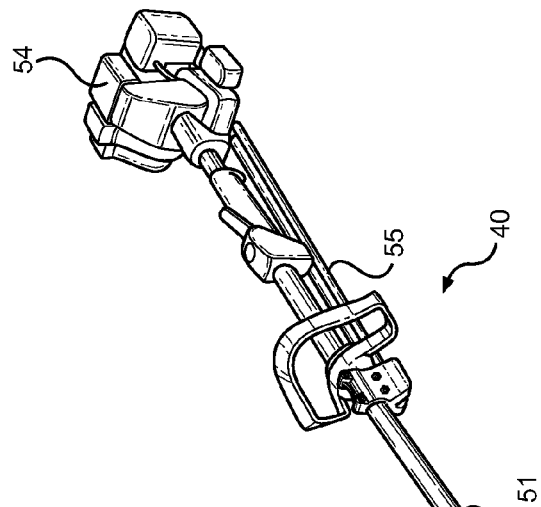
FIG. 9 shows a view of an embodiment of the string trimmer attachment as secured to a string trimmer and wherein the base has two halves.

Referring now to FIG. 9, there is shown a view of embodiment of the string trimmer attachment as secured to a string trimmer and wherein the base has two halves. The illustrated embodiment of the present invention comprises a compact base 40 that has a small profile and that is lightweight. A leg is pivotally attached to the channel on each base half. In a folded configuration, the legs rotate within the channel until the legs are positioned alongside of the shaft of the trimmer. Due to the shape of the channels in which the legs are positioned, the legs are substantially parallel to one another and to the shaft of the trimmer when in the folded configuration. However, in the unfolded configuration, the legs extend from the base at an angle relative to one another. Preferably, the legs extend from one another such that the angle therebetween is an acute angle. In this way, the legs provide stability to the string trimmer disposed on the base and held in an upright orientation convenient for changing a trimmer line.

The present invention relates to a string trimmer support attachment comprising a base having a securement means for securing a shaft of a string trimmer thereon. The base comprises a pair of elongated legs that are pivotally attached to the base. In a folded configuration, the legs are arranged alongside of the shaft of the string trimmer so as to allow the string trimmer to be used in the ordinary manner. In the unfolded configuration, the legs hold the string trimmer head in an elevated, angled position to facilitate changing the trimmer line. The legs extend outward from the base such that the legs are disposed at an angle relative to one another.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A string trimmer attachment, comprising:
   a base having a securement means for securing a string trimmer shaft;
   said base comprising a first base half and a second base half, wherein each of said first base half and said second base half comprise a semi-circular groove thereon such that when said first base half and second base half are aligned, the semi-circular grooves form a circular opening in which a string trimmer shaft can be positioned;
   one or more upper apertures disposed on each of said first base half and said second base half;
   one or more lower apertures disposed on each of said first base half and said second base half such that said circular opening is positioned between said one or more upper apertures and said one or more lower apertures when said first base half and said second base half are aligned;

a pair of legs comprising a first leg pivotally attached to and disposed in a first channel disposed on a lower end of said first base half, and a second leg pivotally attached to and disposed in a second channel disposed on a lower end of said second base half, wherein said first leg and said second leg each extend radially from said circular opening;

wherein said pair of legs pivot between a folded configuration in which said pair of legs are arranged alongside of a string trimmer shaft, and an unfolded configuration in which said pair of legs are positioned at an angle relative to said string trimmer shaft;

wherein said pair of legs are disposed at an angle relative to one another when said pair of legs are in an unfolded configuration.

2. The string trimmer attachment of claim 1, wherein said base comprises a semi-circular shape.

3. The string trimmer attachment of claim 1, wherein said base comprises a leg receiving section disposed on a curved portion of said base.

4. The string trimmer attachment of claim 1, wherein each of said legs are pivotally secured to said base by means of a pin inserted through each of said legs and secured on opposing sides to said base.

5. The string trimmer attachment of claim 1, further comprising:

a pair of support arms secured to said pair of legs and wherein said support arms converge at a U-shaped holding structure disposed on an end of said support arms.

6. The string trimmer attachment of claim 1, wherein each of said legs is pivotally secured to a base half by means of a pin inserted through said leg and secured on opposing sides to said base half.

7. The string trimmer attachment of claim 1, wherein said legs are arranged such that each of said first and second legs extend outward from said first base half and said second base half at an angle relative to one another.

8. The string trimmer attachment of claim 1, wherein said pair of legs are substantially parallel to one another when said pair of legs are in said folded configuration.

* * * * *